US006784560B2

(12) United States Patent
Sugimoto et al.

(10) Patent No.: US 6,784,560 B2
(45) Date of Patent: Aug. 31, 2004

(54) ENGINE GENERATOR (75) Inventors: Yasuo Sugimoto, Wako (JP); Yoshio Tanaka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 159 days.

(21) Appl. No.: 10/252,122

(22) Filed: Sep. 23, 2002

(65) Prior Publication Data
US 2003/0071465 A1 Apr. 17, 2003

(30) Foreign Application Priority Data
Sep. 25, 2001 (JP) ........................................ 2001-290822

(51) Int. Cl.[7] .............................................. F02B 77/13
(52) U.S. Cl. ........................ 290/1 R; 290/1 A; 123/2; 181/200
(58) Field of Search ................................ 290/1 R, 1 A, 290/1 B; 123/2, 3; 181/198, 200

(56) References Cited

U.S. PATENT DOCUMENTS

| 4,608,946 A | * | 9/1986 | Tanaka et al. ................. 123/2 |
| 4,702,201 A | * | 10/1987 | Odo et al. ...................... 123/2 |
| 4,721,070 A | * | 1/1988 | Tanaka et al. ................. 123/2 |
| 4,827,147 A | * | 5/1989 | Mizushima ................. 290/1 A |
| 5,297,517 A | * | 3/1994 | Brandt et al. ............ 123/198 F |
| 5,575,349 A | * | 11/1996 | Ikeda et al. ................ 180/68.1 |
| 5,624,589 A | | 4/1997 | Latvis et al. |
| 5,977,667 A | * | 11/1999 | Hirose ............................ 310/51 |
| 6,491,133 B2 | * | 12/2002 | Yamada et al. ............. 181/200 |

FOREIGN PATENT DOCUMENTS

| EP | 0 893 587 A2 | 1/1999 | |
| EP | 1296039 A1 | * 3/2003 | ........... F02B/77/13 |
| JP | 64-3777 | 2/1989 | |
| JP | 11036886 A | * 2/1999 | ........... F02B/77/13 |
| JP | 11-62607 | 3/1999 | |

OTHER PUBLICATIONS

European Search Report EP 02 02 1482.
Patent Abstracts of Japan, JP 02 016333 published Jane 19, 1990.

* cited by examiner

Primary Examiner—Joseph Waks
(74) Attorney, Agent, or Firm—Arent Fox PLLC (57) ABSTRACT An engine generator including a soundproofing case that houses an engine and a generator therein. The engine includes an engine-side cooling fan and an engine-side inlet. The generator includes a generator-side cooling fan and a generator-side inlet. The engine generator further includes an engine-side partition and a generator-side partition fixedly disposed within the soundproofing case to define a chamber to be cooled that houses sections of the engine and the generator that are to be cooled, an engine-side air intake chamber that the engine-side inlet faces, and a generator-side air intake chamber that the generator-side inlet faces. The soundproofing case includes a cover part whose inside face is in intimate contact with the outer peripheries of the engine-side and generator-side partitions and has an exhaust vent in a part corresponding to the chamber to be cooled.

10 Claims, 7 Drawing Sheets

FIG.7 even the present invention relates to an engine generator. In
ENGINE GENERATOR

BACKGROUND OF THE INVENTION

1. Field of the Invention

The present invention relates to an engine generator. In particular, the present invention relates to an improvement of an engine generator in which an engine and a generator are housed in a soundproofing case. The engine includes a crankshaft, an engine-side cooling fan fixed to the crankshaft, and an engine-side inlet provided at one end, in the axial direction, of the crankshaft for guiding cooling air to the engine-side cooling fan. The generator includes a rotating shaft connected at one end to the other end of the crankshaft, a generator-side cooling fan fixed to the rotating shaft, and a generator-side inlet provided at the other end, in the axial direction, of the rotating shaft for guiding cooling air to the generator-side cooling fan.

2. Description of the Related Art

Engine-driven generators are typically used as a power source for work performed outdoors such as, for example, on construction sites. Furthermore, many generators are completely covered with a soundproofing case so as to minimize operating noise in consideration of the operational and surrounding environments when performing work at night in an urban area. In engine generators with such a soundproofing case, the number of intake and exhaust openings is decreased and the size of the intake and exhaust openings is reduced in the pursuit of achieving operational silence. However, since the overall size of the openings is small, adequate consideration to cooling the interior of the soundproofing case must be taken.

From such a viewpoint, an engine generator disclosed in Japanese Utility Model Registration Publication No. 1-3777 includes, within a soundproofing case, a duct covering an engine cylinder head and an exhaust muffler, wherein cooling air is forcibly driven into the duct by a cooling fan, thereby cooling the engine and the exhaust muffler and eliminating thermal effects on other components of the generator.

Furthermore, an engine generator disclosed in Japanese Patent Application Laid-open No. 11-62607 has a dual structure in which a duct covering an engine, a generator, and an exhaust muffler is arranged within a soundproofing case, and cooling air is forcibly driven into the duct, thereby cooling a high temperature section and eliminating thermal effects on other components of the generator.

However, in the arrangement disclosed in Japanese Utility Model Registration Publication No. 1-3777, since outer shells of the engine and the generator are exposed within the soundproofing case, there is a possibility that, depending on the arrangement of internal components, heat released from the outer shells of the engine and the generator might be retained within the soundproofing case. Moreover, in the arrangement disclosed in Japanese Patent Application Laid-open No. 11-62607, the structure for forming a passage for the cooling air is complicated, and during maintenance it is necessary to remove and install the duct in addition to removing and installing the soundproofing case, which is troublesome, requires additional time, and increases overall maintenance costs.

SUMMARY OF THE INVENTION

It is an object of the present invention to overcome the deficiencies of the above-discussed related art. It is also an object of the present invention to provide an engine generator that enables an engine and a generator to be cooled by means of a simple structure and for which maintenance operations are easily carried out.

In order to accomplish the above-mentioned objects, the engine generator of the present invention includes an engine, a generator, and a soundproofing case housing the engine and the generator. The engine includes a crankshaft, an engine-side cooling fan fixed to the crankshaft, and an engine-side inlet at one end, in the axial direction, of the crankshaft, the engine-side inlet guiding cooling air to the engine-side cooling fan. The generator includes a rotating shaft coaxially connected at one end to the other end of the crankshaft, a generator-side cooling fan fixed to the rotating shaft, and a generator-side inlet at the other end, in the axial direction, of the rotating shaft, the generator-side inlet guiding cooling air to the generator-side cooling fan.

The engine generator further includes an engine-side partition fixedly disposed within the soundproofing case and defining a chamber to be cooled that houses sections of the engine and the generator that are to be cooled, and an engine-side air intake chamber that the engine-side inlet faces. The engine generator also includes a generator-side partition fixedly disposed within the soundproofing case so as to define the chamber to be cooled and a generator-side air intake chamber that the generator-side inlet faces. The soundproofing case includes a cover part covering the engine and the generator. The outer peripheries of the engine-side and generator-side partitions are in intimate contact with the inside face of the cover part. An exhaust vent is provided in an area of the cover part corresponding to the chamber to be cooled.

In accordance with the above-described structural arrangement, since the cover part, which is a component of the soundproofing case, is arranged so as to cover the engine and the generator, spaces defined by the engine-side and generator-side partitions are formed within the soundproofing case. A cooling air passage of the engine is used as a passage connecting opposite sides of the engine-side partition. A cooling air passage of the generator can also be used as a passage connecting opposite sides of the generator-side partition. Thus, cooling air is forced to flow so as to be combined in the chamber to be cooled where the sections to be cooled of the engine and the generator are housed, and then discharged to the outside from the exhaust vent, thereby forming the passages for cooling air within the soundproofing case with a simple structure while allowing maintenance to be carried out easily.

In addition to the above-described structural arrangement, the engine generator can also include an exhaust muffler, an air cleaner, a carburetor, and an electrical component. Additionally, the soundproofing case may include first and second side plates facing the outside faces of the engine-side and generator-side partitions with a gap therebetween. The exhaust muffler and the majority of the engine and the generator are housed in the chamber to be cooled. The air cleaner and the carburetor are housed in the engine-side air intake chamber formed within the soundproofing case between the engine-side partition and the first side plate. The electrical component is housed in the generator-side air intake chamber formed within the soundproofing case between the generator-side partition and the second side plate.

Accordingly, the soundproofing case is easily divided into the chamber to be cooled having a high temperature, which is in the middle, and air intake chambers having a low temperature on opposite sides of the chamber to be cooled, so that the arrangement of components can be appropriately achieved for the respective chambers to be effectively cooled.

The engine generator may further include an elastic seal provided between the engine-side partition and the engine, and an elastic seal provided between the generator-side partition and the generator. In accordance with this arrangement, it is possible to reliably block the flow of air from the chamber to be cooled having a high temperature to the air intake chambers having a low temperature on opposite sides of the chamber to be cooled, thus suppressing heat leakage from the chamber to be cooled to the air intake chambers on opposite sides thereof as well as imparting to the air intake chambers the function of suppressing noise leakage.

The engine generator may also include a base frame, an engine-side outside air inlet, and a generator-side outside air inlet. The base frame forms a part of the soundproofing case, the engine and the generator are disposed on the base frame, the engine-side and generator-side outside air inlets guide outside air to the engine-side and generator-side air intake chambers, respectively, and are provided in the base frame. In accordance with this arrangement, air can be introduced from the outside into the air intake chambers with a simple structure while minimizing leakage of intake noise to the outside.

The exhaust muffler may also be arranged in the chamber to be cooled above the generator and the exhaust vent provided in the cover part above the exhaust muffler. In accordance with this arrangement, the ventilation effect of natural convection within the chamber to be cooled is enhanced even after the engine generator is stopped. Moreover, the flow of air caused by natural convection is made to flow above the sections of the engine and the generator disposed within the chamber to be cooled, thus enhancing the cooling effect.

The above-described and other objects, characteristics and advantages of the present invention will become readily apparent from an explanation of a preferred embodiment that will be described in detail below by reference to the attached drawings.

DESCRIPTION OF PREFERRED EMBODIMENT

Referring to FIGS. 1 to 5, an engine generator includes a soundproofing case 18 housing an engine 11, a fuel tank 12, a generator 13 driven by the engine 11, a battery 14, an air cleaner 15, a carburetor 16 and an exhaust muffler 17 connected to the engine 11. The soundproofing case 18 is formed from a substantially rectangular base frame 19, first and second side plates 22, 23 standing on longitudinally opposite ends of the base frame 19, and a cover part 24 covering the base frame 19 between the two side plates 22, 23.

The base frame 19 is formed from a substantially rectangular base plate 20 and a pair of reinforcing frames 21 fixed to the lower face of the base frame 20. The reinforcing frames 21 are fixed at positions spaced in the width direction of the base plate 20 and extending in the longitudinal direction of the base plate 20. Each reinforcing frame 21 is formed from substantially U-shaped steel so as to define, between the frame 21 and the lower face of the base plate 20, a space having a rectangular cross section. Moreover, brackets 28 are fixed to the lower face of the base plate 20 at positions adjacent to opposite ends in the longitudinal direction of each of the reinforcing frames 21. Disposed between the brackets 28 and the corresponding reinforcing frame 21 are wheels 29 with their axle shafts being rotatably supported thereby.

Provided on the periphery of the base plate 20 is a bent section 20a that is bent upward at a right angle. Secured to the bent section 20a of the base plate 20 are lower parts of the first and second side plates 22, 23 which are mounted at longitudinally opposite ends of the base plate 20 by means of a plurality of screws 30. A handle 31 for carrying the engine generator is fixed to upper parts of the first and second side plates 22, 23.

Figure 6:
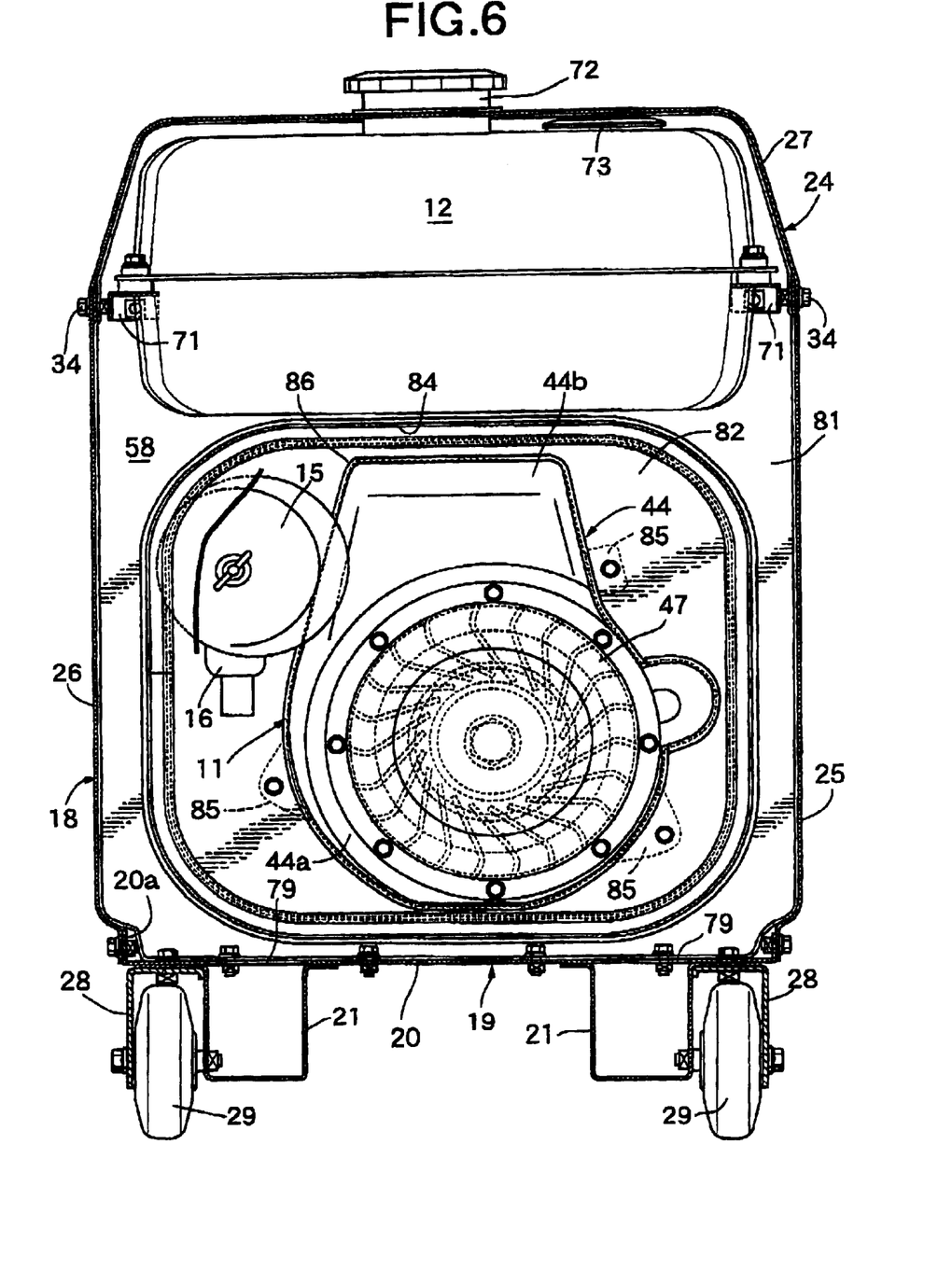
FIG. 6 is a magnified cross-sectional view taken along line 6—6 in FIG. 4.
Figure 7:
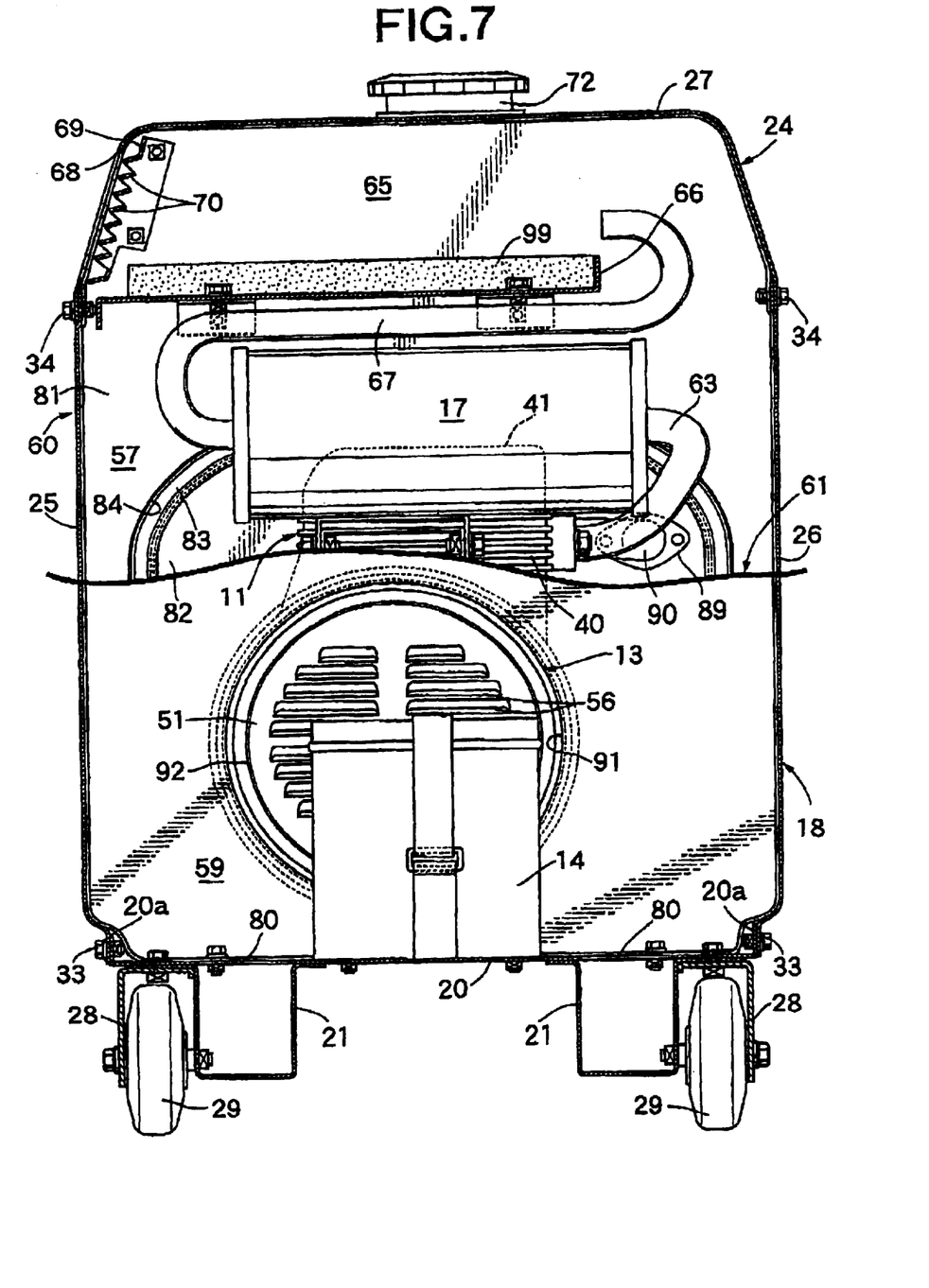
FIG. 7 is a magnified cross-sectional view taken along line 7—7 in FIG. 4.

Referring to FIGS. 6 and 7, the cover part 24 includes a pair of flat parallel side covers 25, 26 and a top cover 27 bridging upper parts of the side covers 25, 26. Opposite ends of each side cover 25, 26 are secured to corresponding sides of the first and second side plates 22, 23 by a plurality of screws 32. A lower part of each side cover 25, 26 is secured to the bent section 20a of the base plate 20 on corresponding sides by a plurality of screws 33. The top cover 27 has a substantially inverted U-shaped cross section so as to coincide with the shape of the upper parts of the first and second side plates 22, 23. Lower parts, at opposite sides, of the top cover 27 are secured to the upper parts of the side covers 25, 26 by a plurality of screws 34, with the ends of the lower parts of the top cover 27 abutting against the tops of the first and second side plates 22, 23. Furthermore, opposite ends, on opposite sides, of the top cover 27 are secured to the first and second side plates 22, 23, together with the upper parts, at opposite ends of the side covers 25, 26, by the screws 32.

The engine 11 is a single-cylinder engine having a crankcase 39 supporting a crankshaft 38 extending horizontally in the longitudinal direction of the base frame 19, a cylinder barrel 40 connected to the crankcase 39 and extending upward, and a head cover 41 connected to an upper part of the cylinder barrel 40. The crankcase 39 is supported on the base plate 20 of the base frame 19 via a pair of elastic mount members 42. That is, the engine 11 is elastically supported by the base frame 19.

An engine-side cooling fan 43 is fixedly provided on one end of the crankshaft 38 projecting from the crankcase 39 and is covered with a fan cover 44 fixed to the crankcase 39. The fan cover 44 is formed into a shape that opens toward the engine 11 and integrally has a plate-shaped section 44a surrounding the engine-side cooling fan 43 and an air duct section 44b extending upward from the plate-shaped section 44a, a central part of which is provided with an opening 45.

One end of the crankshaft 38 can be engaged and coupled with a recoil starter 46 housed in a plate-shaped recoil starter housing 47, which is coaxially fixed to the plate-shaped section 44a of the fan cover 44. A plurality of engine-side inlets 48 are provided on a side wall of the recoil starter housing 47.

When the engine-side cooling fan 43 rotates together with the crankshaft 38 during operation of the engine 11, air that is taken into the recoil starter housing 47 via the engine-side inlets 48 is guided to the interior of the plate-shaped section 44a of the fan cover 44 via the opening 45. Centrifugal force of the engine-side cooling fan 43 acting on the air within the plate-shaped section 44a forces the cooling air to flow from the plate-shaped section 44a to the air duct section 44b, from the air duct section 44b to the cylinder barrel 40 and the head cover 41 of the engine 11. Mounted on and covering the head cover 41 of the engine 11 is a cover 53 connected to the air duct section 44b of the fan cover 44 at one end and is open at the other end. The cooling air flowing from the air duct section 44b flows between the head cover 41 and the cover 53.

A starter motor 49 is mounted on the outer side of the cylinder barrel 40 in the engine 11 and an actuating force generated by the starter motor 49 can be imparted to the engine 11.

The generator 13 includes a rotating shaft 50 coaxially connected at one end to the other end of the crankshaft 38. A casing 51 of the generator 13 is supported on the base plate 20 of the base frame 19 via a pair of elastic mount members 52. That is, the generator 13 is elastically supported on the base frame 19.

A generator-side cooling fan 54 is fixed to the one end of the rotating shaft 50 within the casing 51. A plurality of air outlets 55 are provided in a lower part of a wall of the casing 51 at one end, in the axial direction of the rotating shaft 50, of the casing 51. That is, the air outlets 55 are provided in a section of the engine generator corresponding to the generator-side cooling fan 54. The air outlets 55 are formed so as to eject air toward the inside face of the side cover 26 of the cover part 24.

The generator 13 is designed so the air that is sucked into the interior of the casing 51 at the other end, in the axial direction, of the rotating shaft 50 is forced to flow to the air outlets 55, thus cooling electrical components within the casing 51. Provided on the face of the casing 51 at the other end, in the axial direction, of the rotating shaft 50 are a plurality of generator-side inlets 56 through which cooling air is sucked into the interior of the casing 51 in response to the action of the generator-side cooling fan 54.

Fixedly arranged within the soundproofing case 18 are an engine-side partition 60 and a generator-side partition 61 that define three sections within the soundproofing case 18. More particularly, the three sections are a chamber to be cooled 57, an engine-side air intake chamber 58, and a generator-side air intake chamber 59 on opposite sides of the chamber to be cooled 57.

The chamber to be cooled 57 houses sections of the engine 11 and the generator 13 that are to be cooled and is formed within the soundproofing case 18 between the engine-side partition 60 and the generator-side partition 61. Moreover, the chamber to be cooled 57 houses the exhaust muffler 17 disposed above the generator 13 so that the opening on the other end of the cover 53 of the engine 11 faces a side face of the exhaust muffler 17.

The engine-side inlets 48 of the engine 11 are arranged so as to face the engine-side air intake chamber 58. The engine-side air intake chamber 58 is formed within the soundproofing case 18 between the engine-side partition 60 and the first side plate 22 forming a part of the soundproofing case 18 and facing the outer side of the engine-side partition 60. The generator-side inlets 56 of the generator 13 are arranged so as to face the generator-side air intake chamber 59. The generator-side air intake chamber 59 is formed within the soundproofing case 18 between the generator-side partition 61 and the second side plate 23 forming a part of the soundproofing case 18 and facing the outer side of the generator-side partition 61.

The exhaust muffler 17 is formed into a cylinder with closed opposite ends, is disposed above the generator 13 by effectively utilizing the space above the generator 13, and is supported by a support stay 62 fixed to the casing 51 of the generator 13. Even when the exhaust muffler 17 is of a large size, in order to avoid any increase in the size of the engine generator in the axial direction of the engine 11 and the generator 13, the exhaust muffler 17 is disposed above the generator 13 with a longitudinal axis substantially horizontal in a direction transverse (orthogonal in this embodiment) to the axes of the engine 11 and the generator 13.

An exhaust pipe 63 extending to the engine 11 is connected to one end of the exhaust muffler 17 facing the side cover 26. Disposed horizontally above the exhaust muffler 17 is a partition 64 supported at opposite ends thereof on the engine-side and generator-side partitions 60, 61 so that an exhaust chamber 65 is formed between the partition 64 and the cover part 24 of the soundproofing case 18. An inlet 66 is formed between the partition 64 and the soundproofing case 18 on the side of the one end of the exhaust muffler 17, the inlet 66 guiding cooling air that has cooled the engine 11, and the generator 13 into the exhaust chamber 65. A pipe 67 communicating at one end with the other end of the exhaust muffler 17 is bent so as to return to the one end of the exhaust muffler 17, and the other end of the pipe 67 is inserted into the exhaust chamber 65 through the inlet 66.

That is, the exhaust chamber 65 is formed in an upper part of the chamber to be cooled 57 and above the exhaust muffler 17 so as to mix the cooling air that has cooled the engine 11 and the generator 13 with the exhaust gas from the exhaust muffler 17. An exhaust vent 68 is provided in the cover part 24, which is an upper part of the soundproofing case 18, on a side wall of the top cover 27 opposite to the inlet 66 so that the mixture of the cooling gas and the exhaust gas from the exhaust chamber 65 is discharged through the exhaust vent 68.

A rectifying plate 69 extending longitudinally between the engine-side partition 60 and the generator-side partition 61 separates the exhaust chamber 65 and the exhaust vent 68. Provided in this rectifying plate 69 are a plurality of vertically spaced slit-shaped through holes. Provided on the rectifying plate 69 are a plurality of guide plates 70 that guide the flow of gas passing through the through holes so as to project toward the exhaust vent 68 at positions corresponding to the through holes.

The engine-side air intake chamber 58 houses the fuel tank 12, the air cleaner 15, and the carburetor 16. The fuel tank 12 is housed in an upper part of the engine-side air intake chamber 58 so as to be elastically supported by a pair of support frames 71 which are provided between the engine-side partition 60 and the first side plate 22. Moreover, provided in the top cover 27 are a through hole 74 and a window 75. A filler tube 72 provided on the top of the fuel tank 12 runs through the through hole 74. A fuel gauge 73 provided on the top of the fuel tank 12 faces the window 75.

The generator-side air intake chamber 59 houses the battery 14 as well as electrical components 76, 77, 78 for operation and control of the engine 11 and the generator 13. The electrical component 76 is fixedly supported on the inner face of the second side plate 23. The battery 14 is fixedly supported on the base plate 20 of the base frame 19.

In order to introduce air from outside of the soundproofing case 18 into the engine-side and generator-side air intake chambers 58, 59, the base plate 20 of the base frame 19 is provided with a pair of engine-side outside air inlets 79 corresponding to the interior of the engine-side air intake chamber 58, and is provided with a pair of generator-side outside air inlets 80 corresponding to the interior of the generator-side air intake chamber 59. Each of the outside air inlets 79, 80 is provided in the base plate 20 so as to open within the reinforcing members 21 of the base frame 19. The spaces between the substantially U-shaped reinforcing members 21 and the base plate 20 function as passages for air to flow in from the outside.

The engine-side partition 60 is formed by providing an endless elastic seal 83 between a case-fixed wall section 81 fixed to the soundproofing case 18 and an engine-fixed wall section 82 fixed to the engine 11 with the gap between the wall section 82 and the outer periphery of the engine 11 being air-tightly sealed. The endless elastic seal 83 seals the entire peripheries of the wall sections 81, 82.

The outer periphery of the case-fixed wall section 81, that is, the outer periphery of the engine-side partition 60, is formed so as to be in intimate contact with the inside face of the cover part 24 of the soundproofing case 18. Provided in the case-fixed wall section 81 is an opening 84 for the fan cover 44 of the engine 11 to run through. The opening 84 is formed into a substantially square shape having rounded corners. The elastic seal 83 is attached to the outer periphery of the engine-fixed wall section 82 so as to be in elastically intimate contact with the inner periphery of the opening 84. The engine-fixed wall section 82 is fixed to a plurality of, for example, three stays 85 provided on the fan cover 44 of the engine 11. Attached to the inner periphery of the engine-fixed wall section 82 is an elastic seal 86 that is in elastically intimate contact with the outer periphery of the fan cover 44.

That is, the elastic seal 86 is provided between the engine-side partition 60 and the engine 11. The engine-fixed wall section 82 is fixed to the fan cover 44 of the engine 11. The plurality of engine-side inlets 48 of the recoil starter housing 47 fixed to the fan cover 44 are provided on the engine-fixed wall section 82 side.

A first intake pipe 87 is connected at one end to the carburetor 16 housed in the engine-side air intake chamber 58. A flange 88 on the other end of the first intake pipe 87 is secured to a flange 89 with the engine-fixed wall section 82 interposed therebetween. The flange 89 is integral with one end of a second intake pipe 90, and the other end of the second intake pipe 90 is connected to the engine 11. That is, the first and second intake pipes 87, 90 that provide a connection between the carburetor 16 and the engine 11 are connected so as to communicate with each other with the engine-fixed wall section 82 interposed therebetween, and the carburetor 16 is supported by the engine-fixed wall section 82.

The generator-side partition 61 is fixed to the soundproofing case 18 so that an outer periphery of the partition 61 is in intimate contact with the inside face of the cover part 24 of the soundproofing case 18. Provided in the generator-side partition 61 is an opening 91 through which the other end of the casing 51 of the generator 13 is arranged to run. The opening 91 is formed into a circular shape so as to correspond to the other end of the casing 51. An endless elastic seal 92 in elastically intimate contact with the outer periphery of the other end of the casing 51 is attached to the generator-side partition 61 at the peripheral edge of the opening 91. That is, the elastic seal 92 is provided between the generator-side partition 61 and the generator 13.

Figure 4:
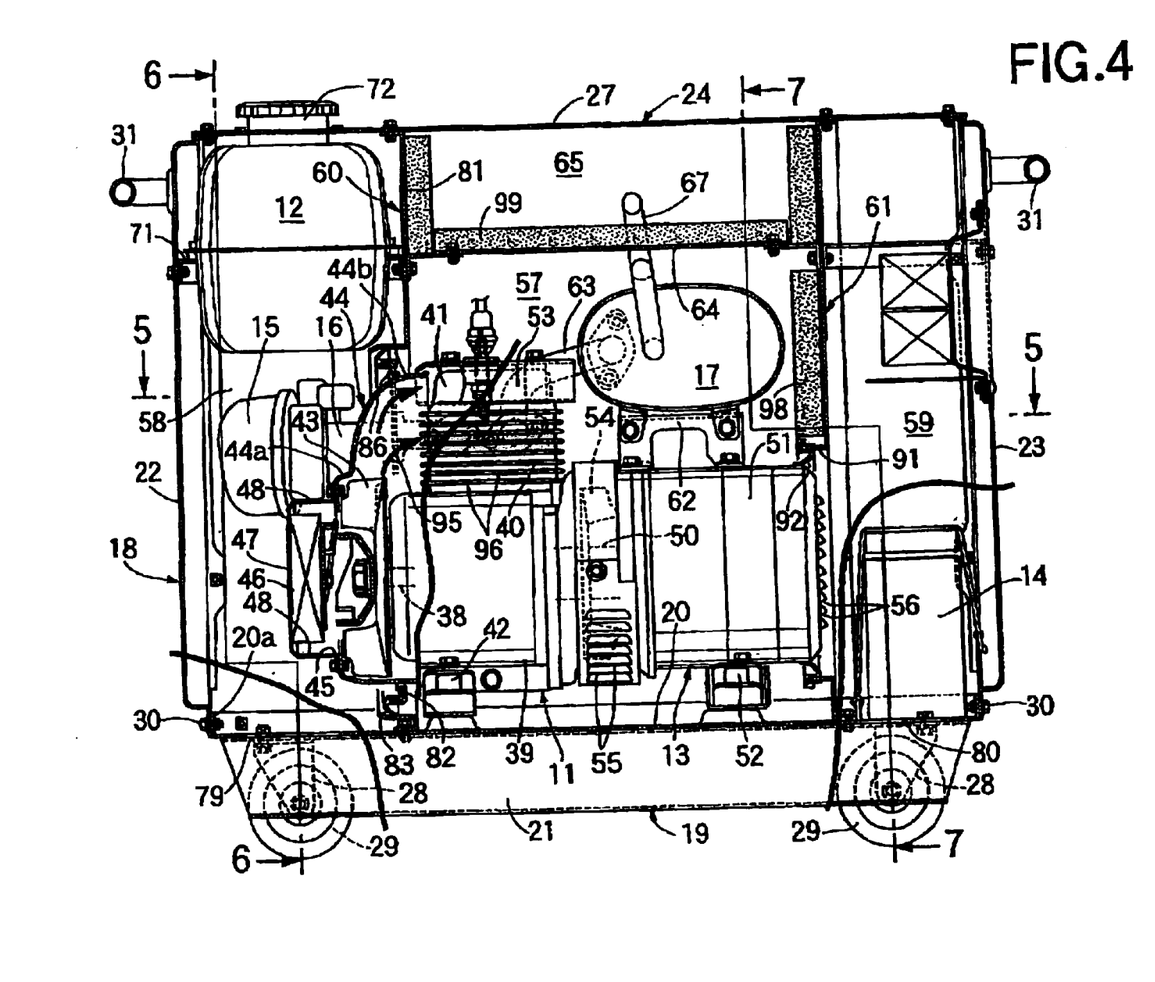
FIG. 4 is a vertical cross-sectional front view of the engine generator shown in FIG. 1.
Figure 5:
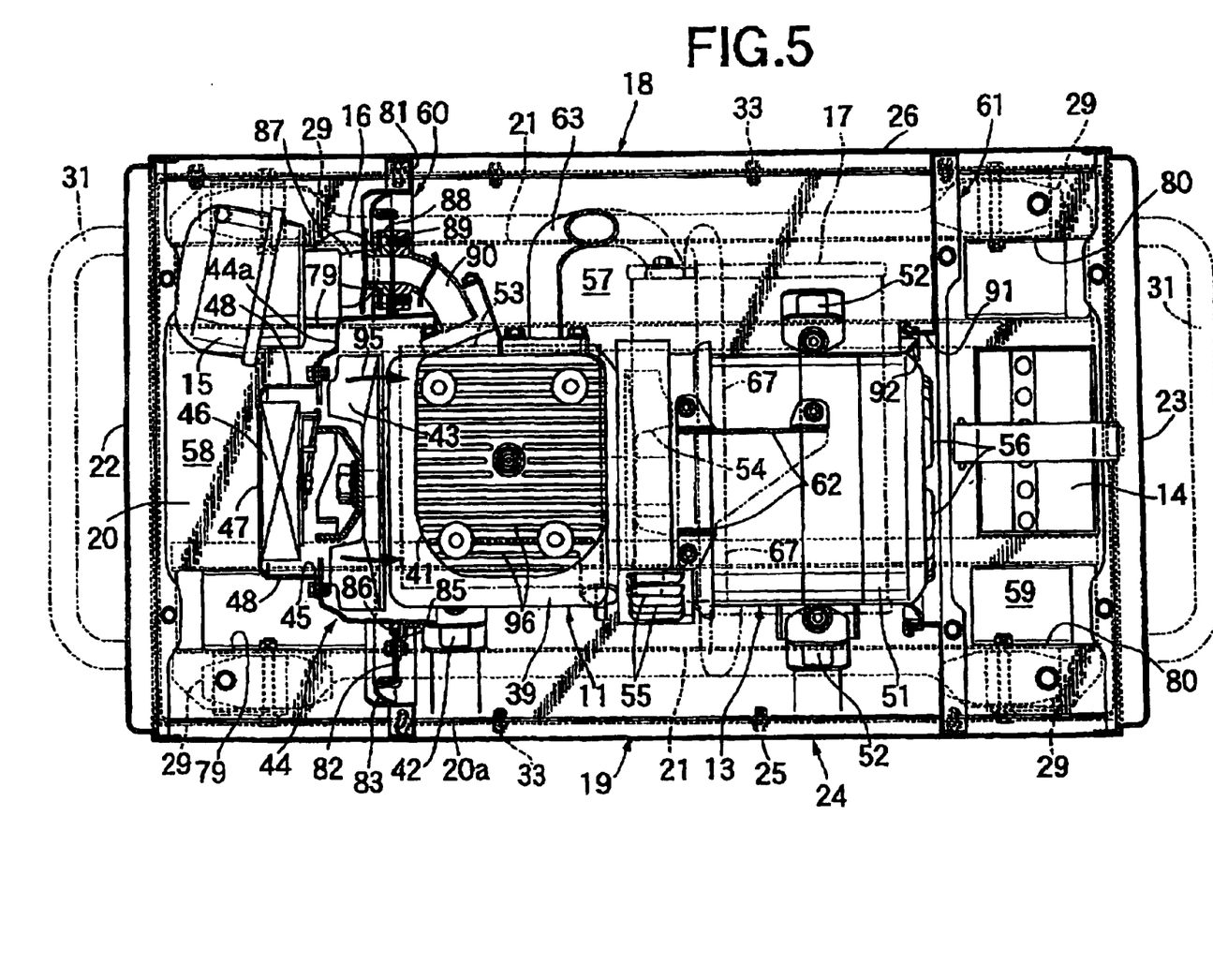
FIG. 5 is a cross-sectional view taken along line 5—5 in FIG. 4.

A first ventilation pathway 95 is formed, as shown by arrows in FIGS. 4 and 5, between the pair of engine-side outside air inlets 79, which are provided in the soundproofing case 18 so as to communicate with the engine-side air intake chamber 58, and the exhaust vent 68, which is provided in the soundproofing case 18 so as to communicate with the exhaust chamber 65 in the upper part of the chamber to be cooled 57. Thus, air that is taken into the engine-side air intake chamber 58 via the engine-side outside air inlets 79 from the outside of the soundproofing case 18 is taken into the fan cover 44 from the engine-side air intake chamber 58 via the engine-side inlets 48 by the engine-side cooling fan 43. The air then flows past the sides of the cylinder barrel 40 and the head cover 41 of the engine 11 within the chamber to be cooled 57 and through the exhaust chamber 65 via the inlet 66. The air is then discharged via the exhaust vent 68 to the outside of the soundproofing case 18.

Moreover, fins 96 provided on the outer faces of the cylinder barrel 40 and the head cover 41 are arranged so as to guide cooling air toward the side of the exhaust muffler 17. The side of the exhaust muffler 17 faces the opening of the cover 53 covering the head cover 41 so that the cooling air from the fan cover 44b flows between the head cover 41 and the cover 53. The first ventilation pathway 95 is therefore arranged so that, part way along, cooling air is blown directly on the side of the exhaust muffler 17.

Figure 1:
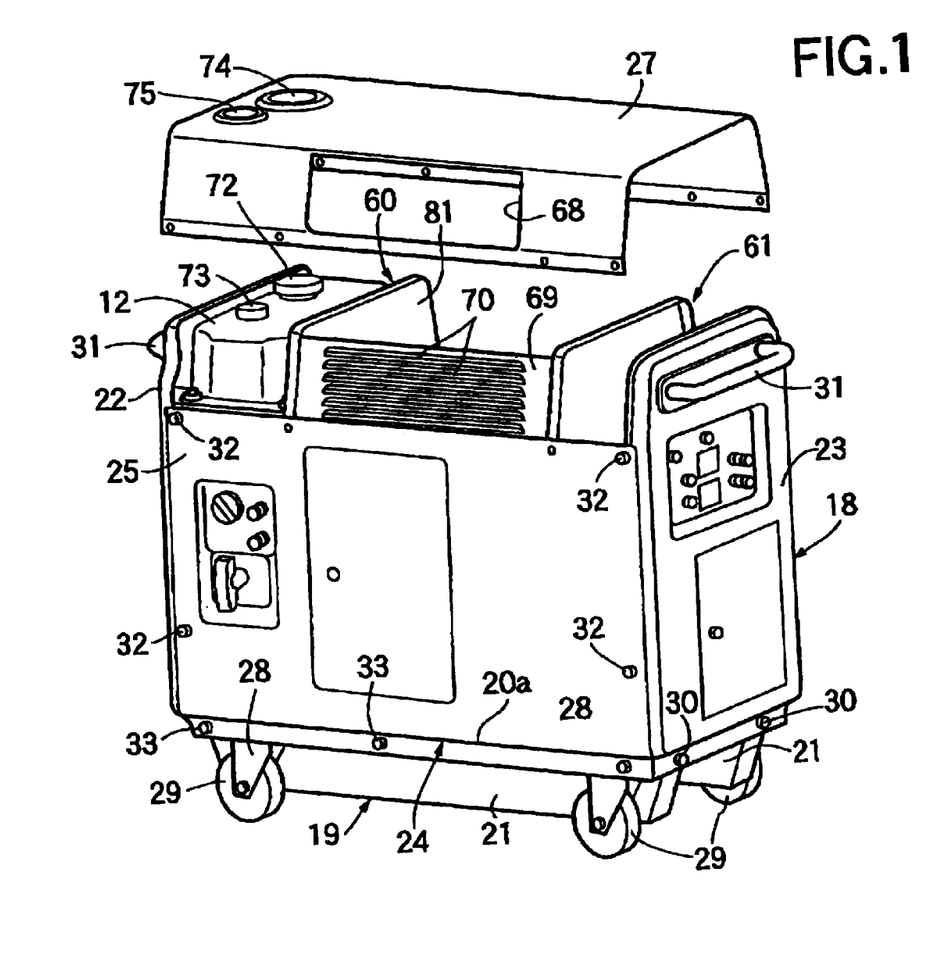
FIG. 1 is a perspective front view of an engine generator with a top cover removed according to the preferred embodiment of the invention.
Figure 2:
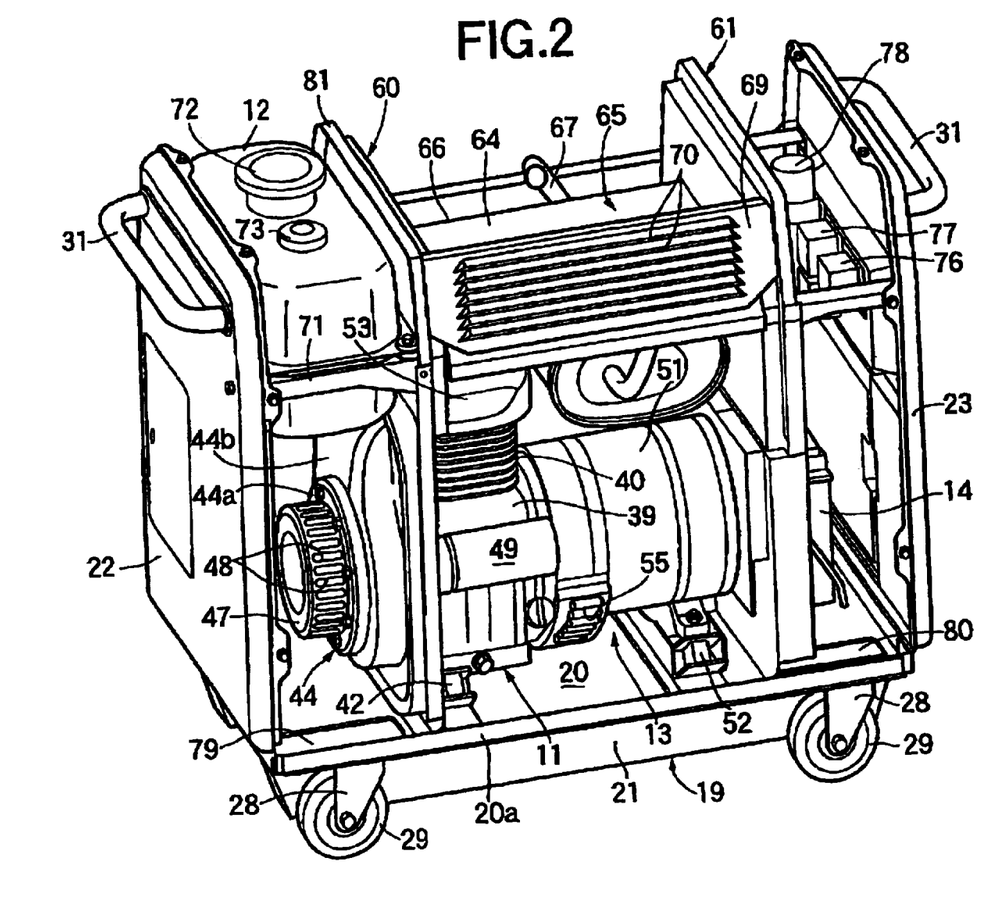
FIG. 2 is a perspective front view of the engine generator shown in FIG. 1 without the cover.
Figure 3:
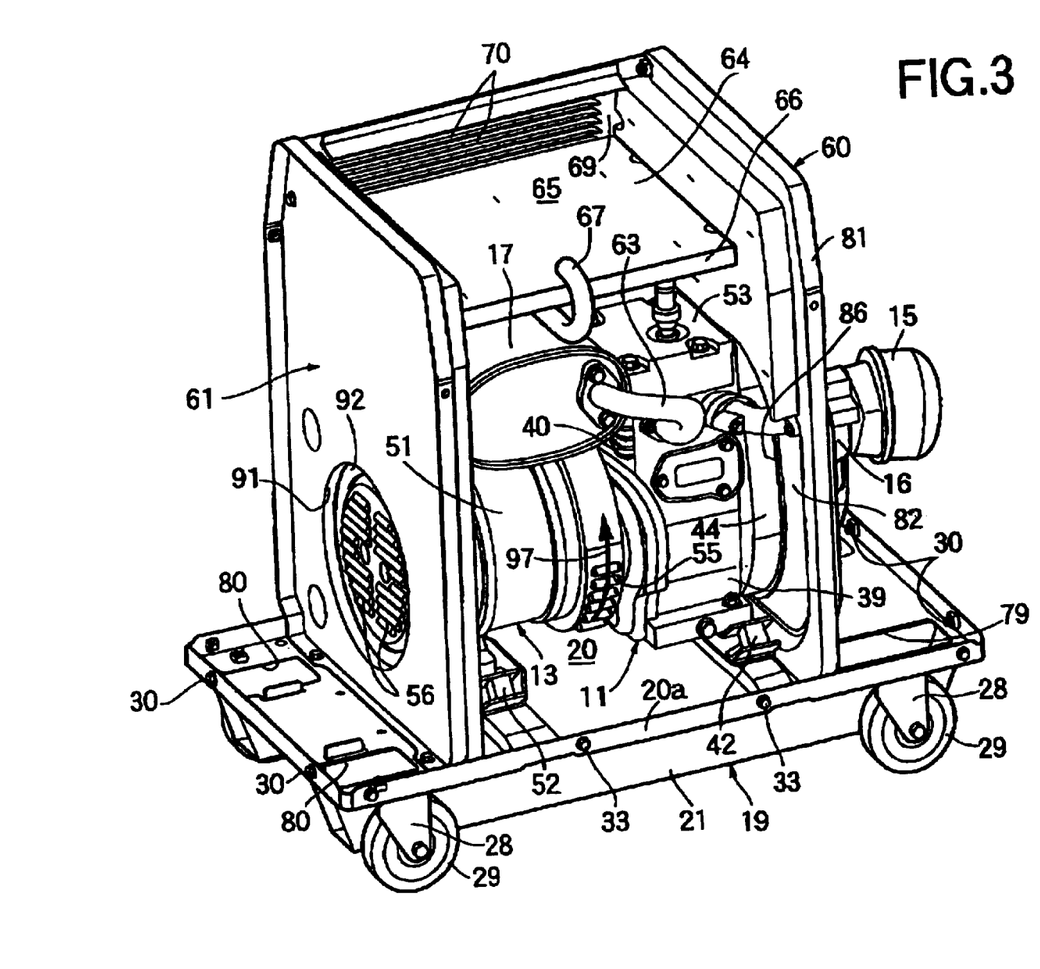
FIG. 3 is a perspective rear view of the engine generator shown in FIG. 1 without a pair of side plates and the cover.

A second ventilation pathway 97 is formed, as shown by the arrow in FIG. 3, between the pair of generator-side outside air inlets 80 which are provided in the soundproofing case 18 so as to communicate with the generator-side air intake chamber 59, and the exhaust vent 68 which is provided in the soundproofing case 18 so as to communicate with the exhaust chamber 65 in the upper part of the chamber to be cooled 57. Thus, air that is taken into the generator-side air intake chamber 59 via the generator-side outside air inlets 80 from the outside of the soundproofing case 18 is taken into the casing 51 of the generator 13 from the generator-side air intake chamber 59 via the generator-side inlets 56 by the generator-side cooling fan 54. The air then passes through the chamber to be cooled 57 via the air outlets 55 in the one end of the casing 51. The air then passes through the exhaust chamber 65 via the inlet 66 and is discharged via the exhaust vent 68 to the outside of the soundproofing case 18.

The air outlets 55 provided in the casing 51 of the generator 13 are formed so as to blow air toward the inside face of the side cover 26 of the cover part 24. The second ventilation pathway 97 therefore extends upward along the inside face of the soundproofing case 18 at one end of the exhaust muffler 17 so as to communicate with the exhaust chamber 65.

A heat insulating material 98 is attached to the engine-side and generator-side partitions 60, 61 on the side of the chamber to be cooled 57. A heat insulating material 99 is also attached to the upper face of the partition 64 facing the exhaust chamber 65.

The operation of the present invention is explained below.

The interior of the soundproofing case 18 housing the engine 11 and the generator 13 coaxially connected to the engine 11 is divided into three chambers. The three chambers are the chamber to be cooled 57, which houses most of the engine 11 and the generator 13, as well as the exhaust muffler 17, and the engine-side and generator-side air intake chambers 58, 59, which are on opposite sides of the chamber to be cooled 57. Moreover, the first and second ventilation pathways 95, 97 are formed between the exhaust vent 68 provided in the upper part of the soundproofing case 18 so as to communicate with the chamber to be cooled 57 and the engine-side and generator-side outside air inlets 79, 80 provided in the soundproofing case 18 so as to communicate with the engine-side and generator-side air intake chambers 58, 59. In the first ventilation pathway 95, air is taken into the engine-side air intake chamber 58 via the engine-side outside air inlets 79 from the outside of the soundproofing case 18, then passes through the chamber to be cooled 57, and is discharged outside the soundproofing case 18 via the exhaust vent 68. In the second ventilation pathway 97, air is taken into the generator-side air intake chamber 59 via the generator-side outside air inlets 80, then passes through the chamber to be cooled 57, and is discharged outside the soundproofing case 18 via the exhaust vent 68.

That is, sections of the engine generator that have a high temperature are placed together in the chamber to be cooled 57, which is in the middle relative to the engine-side and generator-side air intake chambers 58, 59. The first and second ventilation pathways 95, 97 are formed so that cooling air flowing into the chamber to be cooled 57 from the engine-side and generator-side air intake chambers 58, 59, which function as low temperature chambers, flows past the engine 11 and the generator 13 disposed in the chamber to be cooled 57, as well as the exhaust muffler 17, which are arranged in the chamber to be cooled 57, and is smoothly discharged to the outside from the exhaust vent 68. Therefore, it becomes possible to cool the engine generator effectively while preventing heat from being retained within the soundproofing case 18. It is also possible to enhance the soundproofing performance by using the two air intake chambers as zones for preventing the leakage of operating noise.

The engine 11 is elastically supported on the base frame 19 so that the engine-side inlets 48 of the engine 11 face the engine-side air intake chamber 58. The generator 13 is elastically supported on the base frame 19 so that the generator-side inlets 56 of the generator 13 face the engine-side air intake chamber 59. The engine-side partition 60 disposed between the chamber to be cooled 57 and the engine-side air intake chamber 58, as well as the generator-side partition 61 disposed between the chamber to be cooled 57 and the generator-side air intake chamber 59, are fixedly disposed on the base frame 19, which is a part of the soundproofing case 18. The outer peripheries of the engine-side and generator-side partitions 60, 61 are in intimate contact with the inside face of the cover part 24 forming a part of the soundproofing case 18 and covering the engine 11 and the generator 13. The exhaust vent 68 is provided in the cover part 24.

Arranging the cover part 24, which is a part of the soundproofing case 18, so as to cover the engine 11 and the generator 13 can form, within the soundproofing case 18, the chamber to be cooled 57, and the engine-side and generator-side air intake chambers 58, 59, which are defined by the engine-side and generator-side partitions 60, 61. Using the cooling air passage of the engine 11 as a passage connecting opposite sides of the engine-side partition 61 and using the cooling air passage of the generator 13 as a passage connecting opposite sides of the generator-side partition 61 allows cooling air to be combined in the chamber to be cooled 57 where the majority of the engine 11 and the generator 13 and the exhaust muffler 17 are housed, and discharged outside via the exhaust vent 68. The carrying out of maintenance can thus be made easy, and the cooling air passage can be formed as a simple structure within the soundproofing case 18.

The soundproofing case 18 includes the first and second side plates 22, 23 that face the outer sides of the engine-side and generator-side partitions 60, 61 with a gap therebetween. The engine-side air intake chamber 58 is formed within the soundproofing case 18 between the engine-side partition 60 and the first side plate 21, and the generator-side air intake chamber 59 is formed within the soundproofing case 18 between the generator-side partition 61 and the second side plate 23. Therefore, it is possible to easily divide the interior of the soundproofing case 18 into the chamber to be cooled 57 having a high temperature and the air intake chambers 58, 59 having a low temperature on opposite sides of the chamber to be cooled 57, and to arrange parts suitably for each of the chambers 57, 58, 59, thus effectively cooling them.

Moreover, since the engine-side and generator-side outside air inlets 79, 80 are provided in the base frame 19 that forms a part of the soundproofing case 18, the engine-side and generator-side outside air inlets 79, 80 introducing outside air into the engine-side and generator-side air intake chambers 58, 59 respectively, it is possible to introduce the outside air into the two air intake chambers 58, 59 with a simple structure while minimizing leakage of intake noise to the outside, thus maintaining the two air intake chambers 58, 59 at a low temperature.

Furthermore, the fuel tank 12, the air cleaner 15, and the carburetor 16 are arranged within the engine-side air intake chamber 58, and the battery 14 and the electrical components 76 to 78 are arranged within the generator-side air intake chamber 59. Therefore, housing the components that should avoid high temperatures, such as the fuel tank 12, the air cleaner 15, the carburetor 16, the battery 14, and the electrical components 76 to 78 within the respective air intake chambers 58, 59 so as to correspond to the engine 11 and the generator 13 and maintaining each of the air intake chambers 58, 59 at a low temperature, eliminates the need for a special arrangement of parts and measures for heat shielding.

Moreover, disposing the carburetor 16 in the engine-side air intake chamber 58 having a low temperature maintains the air supplied to the engine 11 via the carburetor 16 at a low temperature, thereby maintaining high intake charge efficiency of the engine 11.

The elastic seals 86, 92 are provided between the engine-side partition 60 and the engine 11 and between the generator-side partition 61 and the generator 13, respectively, and the flow of air from the chamber to be cooled 57 having a high temperature to the air intake chambers 58, 59 on opposite sides thereof having a low temperature can be reliably blocked. Accordingly, leakage of heat from the chamber to be cooled 57 to the air intake chambers 58, 59 on opposite sides thereof is suppressed, and the air intake chambers 58, 59 are imparted with the function of suppressing noise leakage from the soundproofing case 18.

Furthermore, since the exhaust muffler 17 is arranged above the generator 13 in the chamber to be cooled 57 and the exhaust vent 68 is provided above the exhaust muffler 17 in the cover part 24 of the soundproofing case 18, the ventilation effect from the natural convection within the chamber to be cooled 57 is enhanced, thereby decreasing the temperature of the interior of the soundproofing case 18 relatively fast even after the engine generator is stopped. Moreover, the flow of air caused by the natural convection is forced to flow above the sections of the engine 11 and the generator 13 disposed within the chamber to be cooled 57, thus enhancing the cooling effect.

The engine-side partition 60 is formed by providing the elastic seal 83 between the case-fixed wall section 81 that is attached to the soundproofing case 18 and the engine-fixed wall section 82 that is attached to the engine 11 by air-tightly sealing the gap between the engine-fixed wall section 82 and the engine 11 with the elastic seal 86. Moreover, the first and second intake pipes 87, 90 connecting the carburetor 16 and the engine 11 are supported on the engine-fixed wall section 82 that vibrates together with the engine 11. The engine-side inlets 48 are provided in the recoil starter housing 47 that vibrates together with the engine-fixed wall section 82. Thus, even when the external shape of the engine 11 is complicated, a large sealing effect can be obtained while simplifying the seal structure between the chamber to be cooled 57 and the engine-side air intake chamber 58, thereby facilitating assembly of the engine 11 and the engine-side partition 60.

Arranged in the upper part of the chamber to be cooled 57 are sections of the first and second ventilation pathways 95, 97 between the soundproofing case 18 and the partition 64 positioned above the exhaust muffler 17. The pipe 67 for guiding exhaust gas from the exhaust muffler 17 is connected to the exhaust chamber 65. That is, the exhaust chamber 65 is formed by partitioning the upper space of the chamber to be cooled 57 with the partition 64. The exhaust chamber 65 combines the exhaust gas from the exhaust muffler 17 with the cooling air that has cooled the engine 11, the generator 13, and the exhaust muffler 17 by passing through the first and second ventilation pathways 95, 97, and guiding the combined exhaust gas and the cooling air to the exhaust vent 68.

The presence of the partition 64 between the exhaust muffler 17 and the exhaust vent 68 effectively reduces the leakage of operating noise generated in the exhaust muffler 17 and lessens the influence of exhaust heat on the engine 11 and the generator 13. Moreover, since the exhaust gas from the exhaust muffler 17 and the cooling air that has cooled the engine 11, the generator 13, and the exhaust muffler 17 are combined in the exhaust chamber 65 and then discharged outside the soundproofing case 18, the exhaust noise is reduced.

The first ventilation pathway 95 extending to the exhaust chamber 65 while cooling the engine 11 is arranged so that, part way along, cooling air is blown directly onto the side of the exhaust muffler 17. The second ventilation pathway 97 extending to the exhaust chamber 65 while cooling the generator 13 is arranged so that, part way along, it passes upward along the inside face of the soundproofing case 18 at said one end of the exhaust muffler 17.

Thus, directly blowing the cooling air onto the side of the exhaust muffler 17 can effectively cool the exhaust muffler 17. Furthermore, since the cooling air from the generator 13 flows upward along the inside face of the soundproofing case 18 at the one end of the exhaust muffler 17, that is, on the inlet 66 side of the exhaust chamber 65, cooling air, including the cooling air that has cooled the exhaust muffler 17, can be guided smoothly to the exhaust chamber 65.

Although an embodiment of the present invention is explained in detail above, the present invention can be modified in a variety of ways without departing from the spirit and scope of the present invention described in the attached claims.

What is claimed is:

1. An engine generator comprising:
    an engine including a crankshaft, an engine-side cooling fan fixed to the crankshaft, and an engine-side inlet at one end, in an axial direction, of the crankshaft, wherein the engine-side inlet guides cooling air to the engine-side cooling fan;
    a generator including a rotating shaft coaxially connected at one end to the other end of the crankshaft, a generator-side cooling fan fixed to the rotating shaft, and a generator-side inlet at the other end, in an axial direction, of the rotating shaft, wherein the generator-side inlet guides cooling air to the generator-side cooling fan;
    a soundproofing case housing the engine and the generator;
    an engine-side partition fixedly disposed within the soundproofing case and defining a chamber to be cooled and an engine-side air intake chamber, wherein the chamber to be cooled houses sections of the engine and the generator that are to be cooled and the engine-side air intake chamber faces the engine-side inlet; and
    a generator-side partition fixedly disposed within the soundproofing case and defining the chamber to be cooled and a generator-side air intake chamber that faces the generator-side inlet,
    wherein the soundproofing case includes a cover part that covers the engine and the generator, outer peripheries of the engine-side and generator-side partitions are in intimate contact with an inside face of the cover part, and the cover part has an exhaust vent disposed in a region corresponding to the chamber to be cooled.

2. The engine generator according to claim 1 further comprising:
    an exhaust muffler;
    an air cleaner;
    a carburetor; and
    an electrical component;
    wherein the soundproofing case includes first and second side plates facing outside faces of the engine-side and generator-side partitions with a gap defined therebetween,
    wherein the exhaust muffler and a substantial portion of the engine and the generator are housed in the chamber to be cooled,
    wherein the air cleaner and the carburetor are housed in the engine-side air intake chamber between the engine-side partition and the first side plate, and
    wherein the electrical component is housed in the generator-side air intake chamber between the generator-side partition and the second side plate.

3. The engine generator according to claim 2 further comprising:
    an elastic seal provided between the engine-side partition and the engine; and
    an elastic seal provided between the generator-side partition and the generator.

4. The engine generator according to claim 3 further comprising:
    a base frame;
    an engine-side outside air inlet; and a generator-side outside air inlet;

wherein the base frame forms a part of the soundproofing case, wherein the engine and the generator are disposed on the base frame, and wherein the engine-side and generator-side outside air inlets that guide air from the outside to the engine-side and generator-side air intake chambers, respectively, are provided in the base frame.

5. The engine generator according to claim 4, wherein the exhaust muffler is arranged in the chamber to be cooled above the generator, and the exhaust vent is provided in the cover part above the exhaust muffler.

6. The engine generator according to claim 3, wherein the exhaust muffler is arranged in the chamber to be cooled above the generator, and the exhaust vent is provided in the cover part above the exhaust muffler.

7. The engine generator according to claim 2 further comprising:

a base frame;

an engine-side outside air inlet; and a generator-side outside air inlet;

wherein the base frame forms a part of the soundproofing case, wherein the engine and the generator are disposed on the base frame, and wherein the engine-side and generator-side outside air inlets that guide air from the outside to the engine-side and generator-side air intake chambers, respectively, are provided in the base frame.

8. The engine generator according to claim 7, wherein the exhaust muffler is arranged in the chamber to be cooled above the generator, and the exhaust vent is provided in the cover part above the exhaust muffler.

9. The engine generator according to claim 2, wherein the exhaust muffler is arranged in the chamber to be cooled above the generator, and the exhaust vent is provided in the cover part above the exhaust muffler.

10. The engine generator according to claim 1, wherein the crankshaft and rotating shaft are coaxial.

* * * * *